United States Patent

More

Patent Number: 5,112,194
Date of Patent: May 12, 1992

[54] COMPOSITE BLADE HAVING WEAR RESISTANT TIP

[75] Inventor: Edwin R. More, Hadley, Mass.

[73] Assignee: United Technologies Corporation, Hartford, Conn.

[21] Appl. No.: 600,646

[22] Filed: Oct. 18, 1990

[51] Int. Cl.[5] .................. F01D 11/00; F01D /5/14
[52] U.S. Cl. .................. 416/230; 415/200; 415/174.4
[58] Field of Search .............. 415/200, 174.4; 416/230, 241 R

[56] References Cited

U.S. PATENT DOCUMENTS

| | | | |
|---|---|---|---|
| 3,090,703 | 5/1963 | Gruber et al. | 415/200 |
| 3,679,324 | 7/1972 | Stargardter | 416/229 A |
| 4,010,884 | 3/1977 | Rothman | 228/190 |
| 4,043,703 | 8/1977 | Carlson | 416/230 |
| 4,071,184 | 1/1978 | Carlson et al. | 228/159 |
| 4,111,606 | 9/1978 | Prewo | 416/241 A |
| 4,249,913 | 2/1981 | Johnson et al. | 51/295 |
| 4,426,193 | 1/1984 | Carlson | 416/229 A |
| 4,550,063 | 10/1985 | Galasso et al. | 428/614 |
| 4,851,188 | 7/1989 | Schaefer et al. | 419/19 |

Primary Examiner—Edward K. Look
Assistant Examiner—Michael S. Lee
Attorney, Agent, or Firm—William W. Habelt

[57] ABSTRACT

A fan blade (24) comprising an airfoil shell (30) made of a fiber reinforced relatively low wear resistance composite material has a tip portion (34) having a plurality of elongated filaments (50) of a highly wear resistant material, most advantageously rod-like boron filaments, embedded therein so as to extend inwardly from the outboard facing surface (36) of the blade (24) and substantially perpendicularly thereto. The filaments (50) comprise cutting elements which serve to rapidly cut away the sacrificial layer (40) of the surrounding fan duct (16) whenever the blade tip (34) comes into contact with the layer (40) thereby protecting the blade tip (34) from excessive wear.

3 Claims, 2 Drawing Sheets

COMPOSITE BLADE HAVING WEAR RESISTANT TIP

TECHNICAL FIELD

This invention relates to rotor blades for ducted rotary propulsion units and, more particularly, to providing wear protection for the outboard tip of a composite rotor blade so that the tip portion of the blade will experience relatively little wear with respect to the portion of the surrounding duct from contact therewith.

BACKGROUND ART

Bypass engines using a ducted thrust fan driven by a turbine power plant are commonly utilized as propulsion units on aircraft. The ducted turbofan unit of such an engine comprises a thrust fan housed within a surrounding by-pass duct disposed thereabout. The fan is typically mounted to the forward end of the turbine power plant in front of the intake to the compressor of the turbine power plant, although rear mounted fans are also known. In any case, the fan is rotatably driven by the turbine power plant, either separately from or jointly with the compressor.

The fan includes a plurality of rotor blades extending radially outward from the hub at equally spaced intervals about the circumference of the hub. The particular number of blades provided and the pitch character of the blades, i.e. whether fixed-pitch or variable-pitch, depends upon the particular application, as well as size of the engine. The by-pass duct is disposed coaxially about the hub of the fan and the engine axis in closely spaced relationship to the outboard tips of the fan blades. It is well appreciated in the art that minimal clearances between the outboard tips of the fan blades and the inner wall of the surrounding duct must be maintained in order to assure the high aerodynamic fan efficiency critical to providing maximum thrust output and fuel economy. With minimal clearances, it is inevitable that during operation the tips of the blades will occasionally contact the surrounding fan duct due to centrifugal forces, thermal effects or vibrations.

Accordingly, it is customary practice to provide a replaceable circumferential wear strip of abradable material in the inner wall of the fan duct in the region thereof surrounding the fan blade tips, the wear strip material having a relatively low wear resistance as compared to the fan blades. Traditionally, fan blades for use in ducted fans have been made of titanium alloys which have a relatively high wear resistance compared to the abradable strip. Thus, when the tips of the titanium blades do occasionally contact the abradable strip as the blades rotate in the fan duct, the tips of the titanium blades wear a track in the sacrificial layer of abradable material thereby permitting the maintenance of minimal clearance between the blade tips and the surrounding fan duct.

Although titanium alloy fan blades have proven very effective in ducted fan applications, the continuing need for improved fuel economy has spurred the search for lower weight fan blades. For example, commonly assigned U.S. Pat. No. 3,799,70 discloses a composite fan blade for use in ducted fan aircraft turbine engines formed by bonding complementary preformed outer shell halves defining the blade planform about a central load carrying spar which extends outwardly beyond the root end of the planform for attaching the composite blade to the fan shaft. The blade planform is fabricated from a composite material having a high tensile modulus such as boron epoxy, boron-aluminum or carbon, while the spar is made from titanium.

Such composite blades can successfully be used in ducted fan applications so long as the sacrificial layer in the surrounding region of the fan duct is made of a material which has a substantially lower wear resistance. For maintenance of maximum fan efficiency, it is highly desirable to minimize wear of the blade tips and permit wear of the sacrificial abradable layer. Heretofore, composite blades made of fiber reinforced epoxy resins, although being of very low weight as desired, have been less suitable for use in ducted fans because of the extremely low wear resistance of the epoxy resin material relative to the materials customarily used in abradable layer of the fan duct.

Accordingly, it is a general object of the present invention to provide a lightweight composite blade equipped with a tip having a relatively high wear resistance thereby rendering the blade suitable for use in ducted rotary devices, such as fans and compressors.

DISCLOSURE OF INVENTION

In accordance with the present invention there is provided a composite blade particularly adapted for use in a ducted rotary device, such as a ducted thrust fan engine, wherein a plurality of blades extend outwardly from a central rotating hub which is coaxially disposed in a surrounding duct which has a circumferential band of sacrificial material mounted therein in closely spaced relationship about the tips of the blades.

The improved fan blade comprises an airfoil body fabricated from a composite material having a relatively low wear resistance and having an outboard tip portion having an end face surface juxtaposed in facing relationship to the surrounding duct, and cutting means operatively associated with the end face surface of the outboard tip portion of said blade for cutting away the sacrificial material in the circumferential band upon contact of the tip portion of the blade therewith. The cutting means advantageously comprise a plurality of elements of high wear resistance material, most advantageously elongated rod-like boron filaments, embedded in the outboard surface of the tip portion so as to extend inwardly from the outboard facing surface and substantially perpendicularly to the outboard facing surface.

BRIEF DESCRIPTION OF DRAWING

The aforementioned and other objects, features and advantages of the present invention will become more apparent in light of the detailed description of a preferred embodiment thereof, as illustrated in the accompanying drawing, wherein.

BEST MODE FOR CARRYING OUT THE INVENTION

Figure 1:
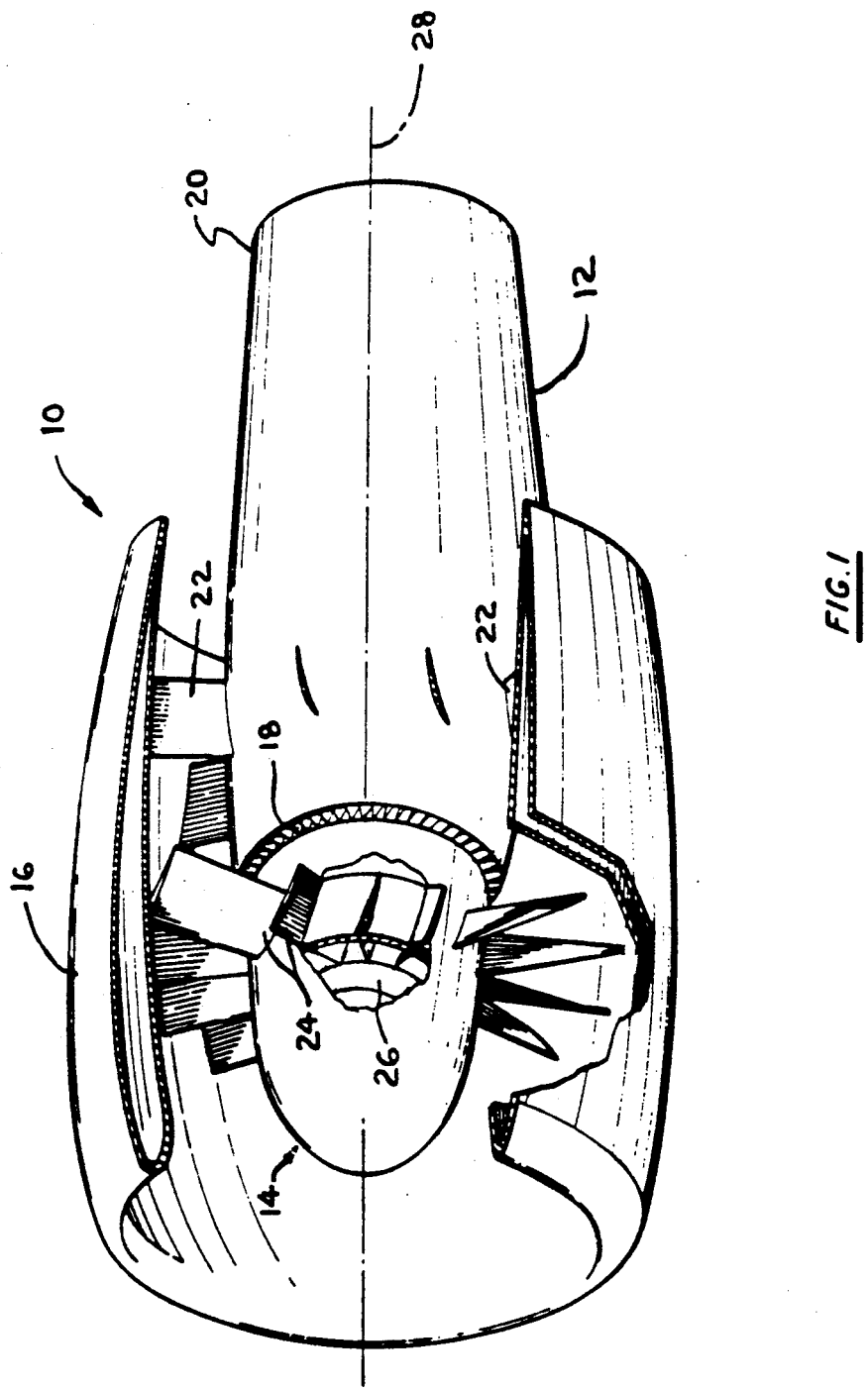
FIG. 1 is a perspective view of a ducted thrust fan aircraft engine.

The blade of the present invention is particularly adapted for use in a ducted rotary device, such as the ducted thrust fan engine of the type illustrated in FIG. 1 commonly utilized as a propulsion unit on aircraft. As depicted therein, the ducted turbofan unit 10 comprises a thrust fan 14 and an associated by-pass duct 16 disposed thereabout. The fan is mounted to the forward end of a turbine-type power plant 12 in front of the intake 18 to the compressor of the turbine power plant 12 and is rotatably driven by the turbine power plant 12, either separately from or jointly with the compressor.

The fan 14 includes a plurality of blades 24 extending radially outwardly from hub 26 at spaced intervals about the circumference of the hub. The particular number of blades 24 provided and the pitch character of the blades, i.e. whether fixed-pitch or variable-pitch, depends upon the particular application, as well as size of the engine. The by-pass duct 16 is disposed coaxially about the hub 26 of the fan 14 and the engine axis 28 in closely spaced relationship to the outboard tips of the fan blades 24 and is supported by means of a plurality of struts 22 extending radially outwardly from the housing 20 of the turbine power plant 12.

Figure 2:
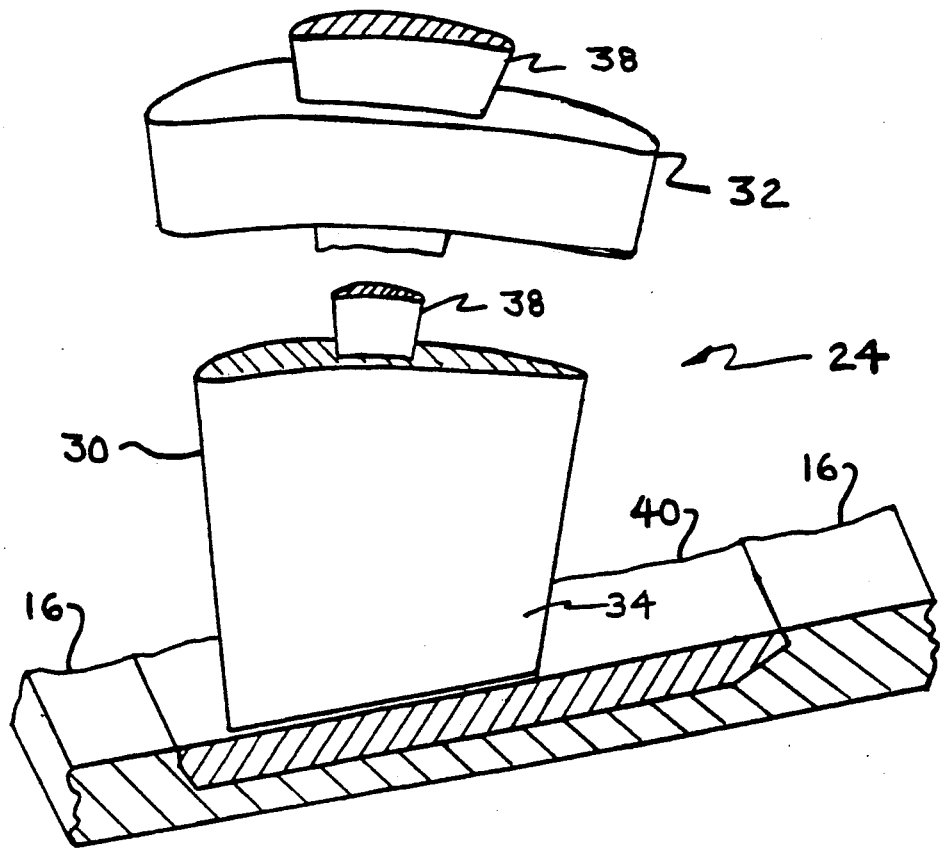
FIG. 2 is a side elevational view, partly in section, illustrating the interface of a fan blade and the surrounding fan duct of the ducted fan of FIG. 1.

As best seen in FIG. 2, a sacrificial band 40 of abradable material is disposed in the inner wall of the fan duct so as to extend circumferentially about the fan blades 24. The fan blades 24 are installed on the hub 26 to extend radially outwardly therefrom with the outboard surface 36 of each blade tip 34 juxtaposed in closely spaced facing relationship with the sacrificial band 40 so as to minimize the gap therebetween in order to minimize air flow entering the fan duct 16 from bypassing the blades 24. In operation, the blades 24 under the influence of centrifugal forces, thermal effects and vibrations, occasionally contact the sacrificial band 40 and abrade the surface thereof. In this manner, the desired minimal clearance between the blade tips 34 and the inner wall of the surrounding fan duct 16 is maintained.

Figure 3:
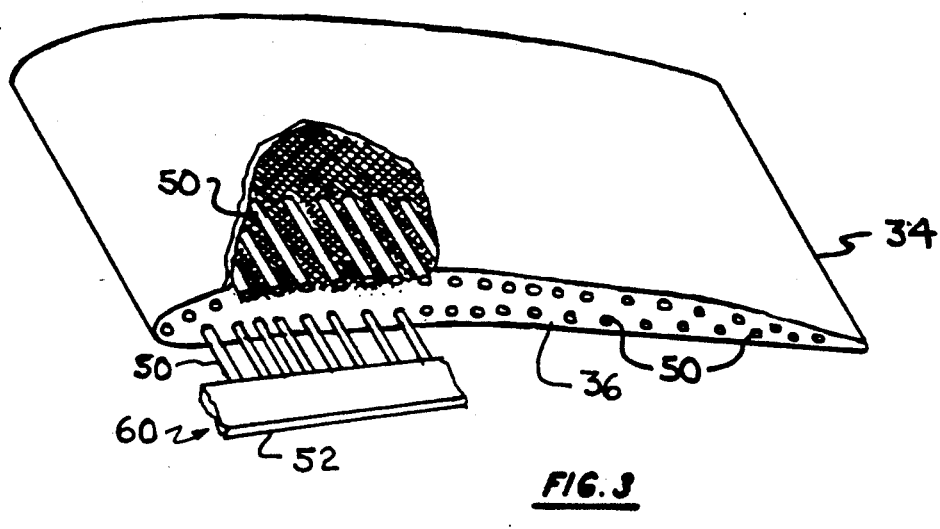
FIG. 3 is a perspective, partly in section, illustrating the fan blade provided with a wear resistant tip in accordance with the teachings of the present invention.

The fan blades 24 are each formed of an airfoil shell 30 fabricated from composite materials having a relatively low wear resistance, such as but not limited to carbon or glass fiber and organic resin, and have an inboard root portion 32 and an outboard tip portion 34. To impart the desired high wear resistance to the surface 36 of the outboard tip portion 34 of the fan blade 24, a plurality of filaments 50 of very high wear resistance material are embedded in the tip section 34. Most advantageously, the filaments 50 comprise elongated rod-like members of very high wear resistance material, such as but not limited to boron filaments, embedded in the tip portion 34 of the fan blade 24 so as to extend substantially perpendicularly relative to the outboard surface 36 of the tip section 34, as best illustrated in FIGS. 2 and 3.

The airfoil body of each blade 24 advantageously may comprise, but is not limited to, a shell 30 of a fiber reinforced relatively low wear resistance composite material disposed about an elongated structural load carrying spar member 38 which extends beyond the airfoil shell 30 through the inboard root section 32 thereof for attaching the fan blade to a rotating shaft disposed within the hub housing 16 of the fan. As depicted in FIG. 3, the airfoil shell 30 may comprise a fiber reinforced body fabricated as is known in the art of a plurality of layers 42 of fabric material overlaid one upon another and thence embedded in a light weight organic resin, such as but not limited to a thermosetting epoxy resin. The fiber reinforced body may also be formed by other techniques known in the art, such as three dimensionally weaving the fibers together over a spar member or a preform to form a monolithic body.

In constructing the airfoil shell 30, the wear resistant filaments 50 are advantageously incorporated therein prior to application of the resin. For example, the wear resistant filaments 50 may be advantageously disposed between layers 42 of the fabric material and embedded therein when the epoxy resin is applied. To accomplish this, the elongated rod-like filaments 50 may bonded at one end to a base member 52 to form a comb-like structure 60 with the free ends of the filaments 50 extending outwardly in parallel spaced relationship from the base member 52. To incorporate the filaments 50 into the blade, the free ends of the filaments 50 extending outwardly from the comb-like structure 60 are inserted through the surface 36 of the outboard tip portion 34 of the blade so as to extend longitudinally into the blade. With the filaments 50 so positioned, the base member 52 is cut away and any portion of the filaments 50 extending beyond the surface 36 trimmed is away.

Of course, more than one array of filaments 50 may be embedded into the tip portion 34 of the blade 24. The exact number of filaments 50 embedded into the tip portion of the blade will depend upon the cutting ability of the filaments 50 relative to the sacrificial band 40 and the speed and effectiveness of the filaments 50 in cutting the sacrificial material. Filaments 50 must be long enough to ensure that the filaments 50 extend from the outboard surface 36 into the tip portion 34 for a distance sufficient to ensure that the filaments 50 can resist the centrifugal and frictional forces exerted upon them during operation and remain firmly embedded in the tip 34.

As conventional light weight organic resins and the fiber reinforcements embedded therein used in forming resin matrix composite blades typically have a relatively low wear resistance, composite blades so fabricated have heretofore been less satisfactory for use in ducted fan applications than conventional titanium alloy blades since the tips of such composite blades would wear away rather than the sacrificial band in the wall of the fan duct thereby causing a reduction in fan efficiency However, by incorporating filaments 50 of a very high wear resistance material into the tip portion 34, a cutting capability is imparted to the surface 36 of the tip 34 of the blade 24 such that when the blade tip comes into contact with the sacrificial layer 40 in the surrounding duct 16, the filaments 50 exposed at the end face surface 36 of the blade will cut into the sacrificial layer 40 to rapidly cut into and trim away the surface of the sacrificial layer 40 thereby clearing a path for the blade tip in the sacrificial layer and minimizing wear of the blade tip 34. The filaments 50 provide a cutting means on the outboard surface of the tip 34 on the composite fan blade 24 which renders the blade suitable for use in a ducted rotary device despite that fact that the blade body is made of a material having a relatively low wear resistance.

It is be understood that with respect to the blade 24 of the present invention, the filaments 50 are of a very high wear resistance material, meaning a material that will effectively cut the sacrificial material making up the band 40 in the wall of the duct 16, while a composite material having a relatively low wear resistance means a composite material, whether resin matrix, graphite matrix or aluminum matrix, that will itself wear away rather than effectively abrade the sacrificial material making up the band 40 in the wall of the duct 16.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention. Further, although the invention has been shown and described as applied to a ducted fan engine, the invention is not limited to such application and may be used in other ducted rotor devices.

We claim:

1. A blade for use in a ducted rotary device of the type having a plurality of blades extending outwardly from a central rotating hub and a duct disposed coaxially about the hub and having a circumferential band of sacrificial material mounted therein in closely spaced relationship about the tips of the blades, said blade comprising:
    a. an airfoil shell fabricated from a composite material having a relatively low wear resistance and having an outboard tip portion having an end face surface juxtaposed in facing relationship to the surrounding duct; and
    b. means operatively associated with the end face surface of the outboard tip portion of said blade for cutting away the sacrificial material in the circumferential band upon contact of the tip portion of said blade therewith, the cutting means comprising a plurality of elements of high wear resistance material embedded in the outboard surface of the tip portion of the relatively low wear resistance shell of said blade.

2. A blade as recited in claim 1 wherein said elements of relatively high wear resistance material comprise elongated rod-like filaments disposed so as to extend substantially perpendicularly relative to the outboard surface of said tip section.

3. A blade as recited in claim 2 wherein said filaments comprise boron filaments.

* * * * *